Jan. 7, 1941.  R. H. BOYD  2,227,423
PLOW ATTACHMENT
Filed June 3, 1940  3 Sheets-Sheet 1

Inventor
Robert H. Boyd,

By Clarence A. O'Brien

Attorney

Jan. 7, 1941.   R. H. BOYD   2,227,423
PLOW ATTACHMENT
Filed June 3, 1940   3 Sheets-Sheet 2

Inventor
Robert H. Boyd.

By Clarence A. O'Brien
Attorney

Jan. 7, 1941.  R. H. BOYD  2,227,423
PLOW ATTACHMENT
Filed June 3, 1940  3 Sheets-Sheet 3
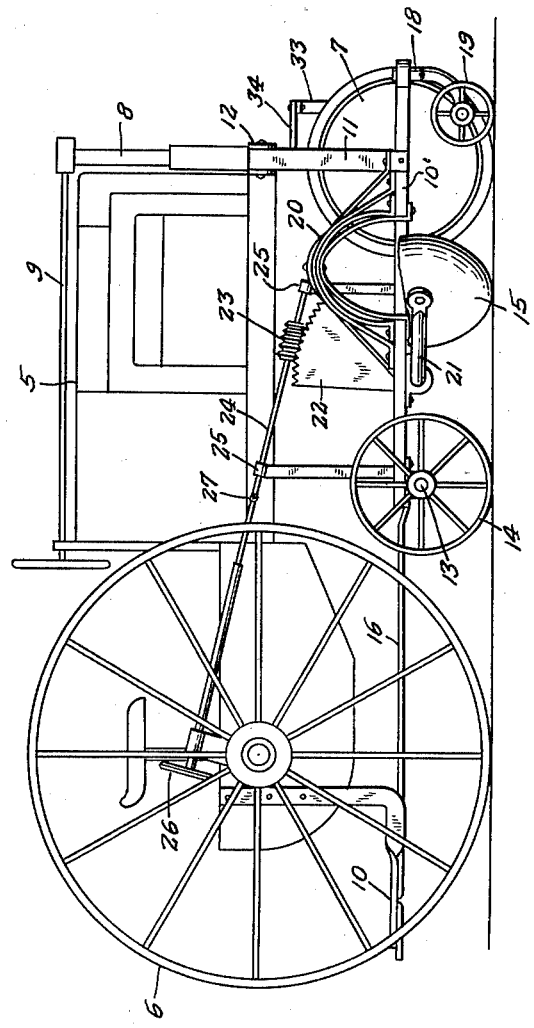
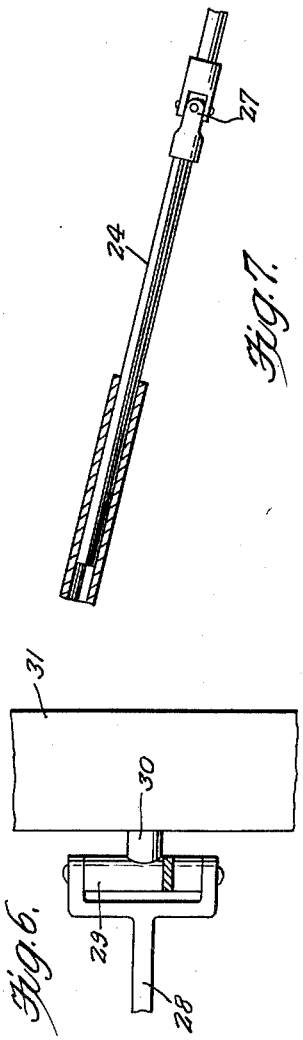
Inventor
Robert H. Boyd
By Clarence A. O'Brien
Attorney Patented Jan. 7, 1941

2,227,423

UNITED STATES PATENT OFFICE 2,227,423

PLOW ATTACHMENT

Robert H. Boyd, Pinetown, N. C.

Application June 3, 1940, Serial No. 338,611

5 Claims. (Cl. 97—47)

This invention relates to a plow in the form of an attachment for a conventional type of tractor, and has for the primary object the provision of a device of this character which may be easily and quickly installed on a tractor and which will permit plowing of the soil in close proximity to objects, such as fences, banks, ditches and the like and with complete safety and rapidity, the construction of the device being such that the plowing operation takes place laterally of the path of travel of the tractor and will compensate for the side thrust developed by the plow acting in the soil on the tractor, and also will aid in the steering of the tractor and includes means for raising and lowering the plow disc to regulate the depth of cut in the soil as well as permitting the plow disc to be raised clear of the ground when need occurs.

With these and other objects in view, as will become more apparent as the description proceeds, the invention consists in certain novel features of construction, combination and arrangement of parts which will be hereinafter more fully described and claimed.

For a complete understanding of my invention, reference is to be had to the following description and accompanying drawings, in which Figure 1 is a top plan view illustrating a tractor equipped with a plow attachment constructed in accordance with my invention.

Figure 3 is a side elevation illustrating the attachment on the tractor.

Figure 6 is a fragmentary side elevation, partly in section, illustrating a steering type thrust wheel.

Figure 7 is a fragmentary side elevation, partly in section, illustrating a portion of an operating bar or rod.

Figure 2:
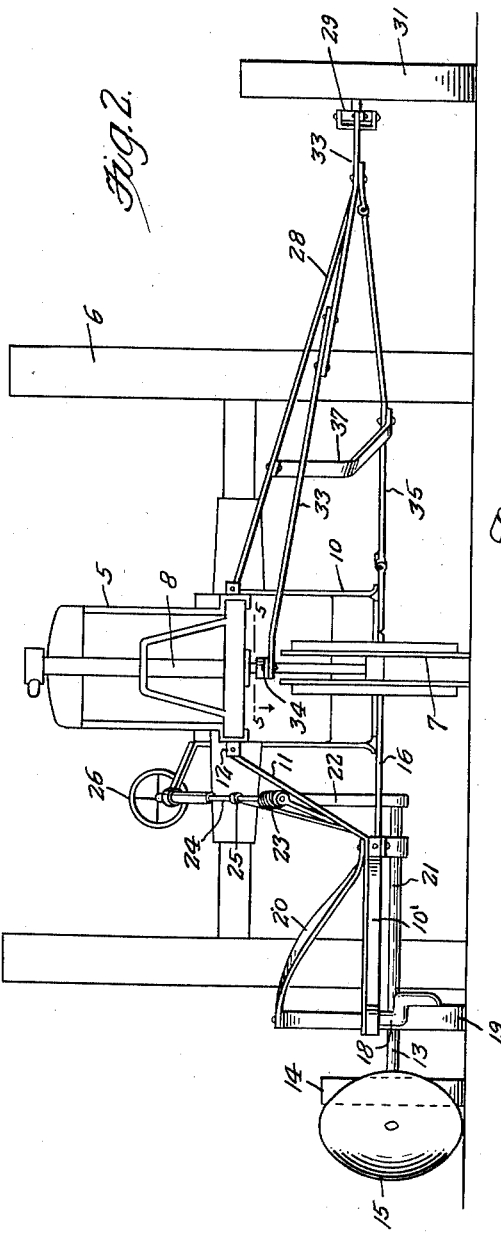
Figure 2 is a front elevation showing the attachment on the tractor.
Figure 4:
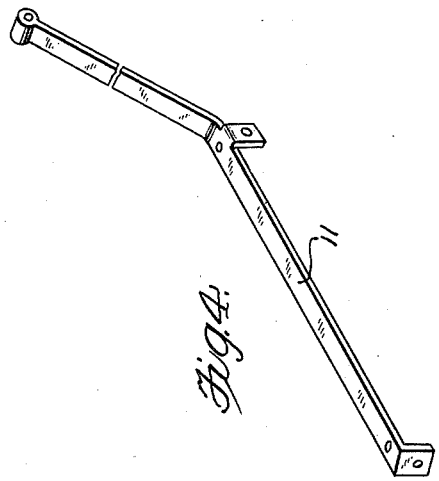
Figure 4 is a perspective view illustrating one of the attaching arms of the attachment.

Referring in detail to the drawings, the numeral 5 indicates a conventional type of tractor and frequently employed for farming purposes. The rear traction wheels of the tractor are indicated by the character 6 while the front wheels by the character 7. By referring to Figure 2 it will be seen that the front wheels are closely associated and are connected to the forward end of the tractor by a steering post 8 connected to the usual steering mechanism 9 of the tractor. The rear portion of the tractor frame is equipped with the usual draft hitch bar 10. The foregoing description briefly describes the tractor to which the present invention is adaptable to permit plowing to be carried out in close proximity to obstructions.

Figure 1:
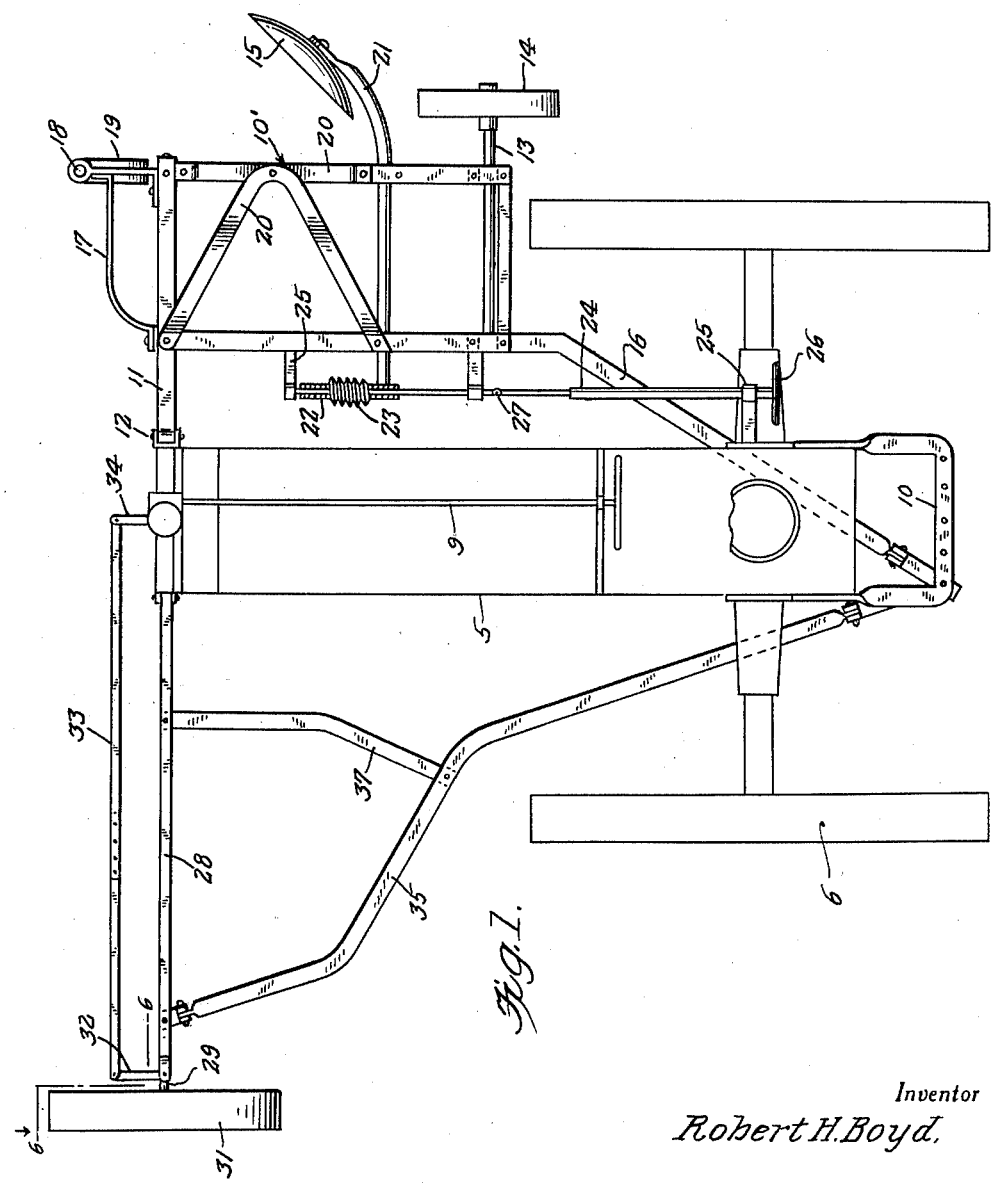
Figure 5:
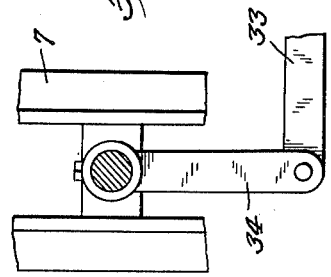
Figure 5 is a fragmentary sectional view taken on the line 5—5 of Figure 2.

A substantially rectangular shaped frame 10' is positioned at one side of the tractor forwardly of one of the rear wheels, as clearly shown in Figure 1. The frame 10' includes an attaching arm 11 secured on the forward end of the tractor by a hinge connection 12 to permit the frame and tractor to have up and downward movements relative to each other. An axle 13 is secured to the frame 10' adjacent the rear end thereof and extends laterally of the rear traction wheels and has journaled thereon a ground wheel 14. This wheel is termed the furrow wheel as it tracks in the path of the plow share or disc 15.

Formed on the rear end of the frame 10' and extending angularly thereto and in the direction of the tractor is an attaching arm 16 which crosses under the tractor and is secured onto the draft hitch bar 10 at an opposite side of the longitudinal axis of the tractor from the location of the frame 10'. The forward outer corner of the frame 10' carries a bracket 17 on which is journaled a shaft 18 of a pilot wheel 19. The connection between the arm 6 and the draft bar 10 is such that it will permit the frame 10' to rise and fall with respect to the tractor when passing over uneven ground. One of the side members of the frame 10' is cut away opposite the plow share or disc 15 and supporting this side of the frame is a series of arched members 20, the purpose of which is to provide for clearance of the soil turned up by the plow share or disc 15.

A plow beam 21 is journaled on the frame 10' transversely thereof rearwardly of the arched members 20 and includes a curved portion on which the plow share or disc 15 is secured, positioning the plow share or disc laterally of one side of the frame 10'. The other end of the plow beam 21 has secured thereto a segment 22 meshing with a worm 23 secured on an operating rod 24. Suitable journals 25 are provided for the operating rod 24 and the latter is equipped with a hand wheel 26 located adjacent the operator's seat on the tractor. Also the rod is composed of sections having telescopic fit whereby the sections may slide relative to each other. The rod 24 further includes sections connected by a universal coupling or joint 27 to compensate for the up and downward movement of the frame 10' relative to the tractor.

By operating the hand wheel 26 the plow share or disc 15 may be raised and lowered with respect to the frame 10' and the ground for regulating the depth of cut made in the soil by the plow share or disc and also for positioning the latter clear of the ground when need occurs.

Hinged on the forward end of the tractor and extending in an opposite direction to the arm 11 and in alignment therewith is an axle 28 including a steering knuckle 29 and an axle spindle 30 on which is journaled a ground engaging thrust wheel 31. The steering arm 32 of the steering knuckle 29 is pivotally connected to a connecting link 33 which is in turn pivotally connected to an arm 34 secured on the steering post 8 of the front wheels 7 of the tractor.

Thus it will be seen that the thrust wheel 31 will be steered in a corresponding direction to the steering of the front wheels of the tractor. The plow share or disc operating at a considerable distance to one side of the tractor will place on the latter a side thrust and the thrust wheel 31 will act to take up the side thrust on the tractor and also aid in steering the tractor.

A brace 35 is connected to the axle 28 adjacent the outer end thereof and to the draft bar 10. The axle is further connected to the brace 35 by an auxiliary brace 37.

Thus it will be seen that a plow attachment has been provided which may be easily and quickly installed on a conventional type of tractor and will operate successfully laterally of one side of the tractor with the plow share or disc engaging the ground a considerable distance from the tractor so that plowing of the soil can be conveniently and safely carried out in close proximity to obstructions.

Further, it will be seen that the side thrust developed on the tractor by the plow share operating in the soil at one side of the tractor will be well taken care of by the thrust absorbing arrangement provided on the tractor and which also aids in the steering of the tractor.

Further, it will be seen that the depth of action of the plow share or disc in the soil can be easily varied and further the plow share by this means may be raised clear of the ground when necessary.

While I have shown and described the preferred embodiment of my invention, it is to be understood that minor changes in construction, combination and arrangement of parts may be made without departing from the spirit and scope of the invention claimed.

Having described the invention, what I claim is:

1. In a device of the character described, a plow frame, means for mounting said frame on a tractor to one side of the latter, ground wheels for supporting said frame, a plow beam journaled on said frame and projecting beyond one side thereof, a plow share carried by said beam, and a hand operated means for rotating the beam for regulating the depth of cut of the plow share in the soil and for clearing the plow share of the ground when desired.

2. In a device of the character described, a plow frame, means for mounting said frame on a tractor to one side of the latter, ground wheels for supporting said frame, a plow beam journaled on said frame and projecting beyond one side thereof, a plow share carried by said beam, a hand operated means for rotating the beam for regulating the depth of cut of the plow share in the soil and for clearing the plow share of the ground when desired, a thrust absorbing device arranged on the opposite side of the tractor from the plow frame and including a ground-engaging thrust wheel and a steering knuckle therefor, and means for connecting the steering knuckle to a steering mechanism of the tractor.

3. In a device of the class described, a plow frame, means for mounting said frame on a tractor at one side thereof for hinging movement relative to the tractor, ground engaging wheels carried by the frame, said frame including an arched portion, a plow beam journaled on said frame transversely thereof and rearwardly of the arched portion, and projecting laterally and forwardly at one side of the frame, a plow share carried by said beam, an operating means connected to said beam for the rotation thereof for regulating the depth of cut of the plow share and for clearing the ground of the share.

4. In a device of the character described, a plow frame, arms integral with said frame and hinged on a tractor for positioning the frame to one side of the tractor in advance to a rear traction wheel of the tractor, ground engaging wheels supporting said frame, a plow beam carried by the frame, a plow share connected to the beam, a hand operated means for rotating the plow beam, an axle hinged on the tractor and extending at right angles thereto and from a side of the tractor opposite to the side of the tractor on which the frame is located, a steering knuckle for said axle and including a spindle, a thrust ground engaging wheel journaled on said spindle, means connecting the steering knuckle to a steering mechanism of the tractor.

5. In a device of the character described, a plow frame, arms integral with said frame and hinged on a tractor for positioning the frame to one side of the tractor in advance to a rear traction wheel of the tractor, ground engaging wheels supporting said frame, a plow beam carried by the frame, a plow share connected to the beam, a hand operated means for rotating the plow beam, an axle hinged on the tractor and extending at right angles thereto and from a side of the tractor opposite to the side of the tractor on which the frame is located, a steering knuckle for said axle and including a spindle, a thrust ground engaging wheel journaled on said spindle, means connecting the steering knuckle to a steering mechanism of the tractor, a brace connected to the axle and to the rear portion of the tractor, an auxiliary brace connected to the first brace and to the axle.

ROBERT H. BOYD.